US012804286B2

(12) United States Patent
Lin et al.

(10) Patent No.: US 12,804,286 B2
(45) Date of Patent: Nov. 17, 2026

(54) PRE-ROLL CIRCUIT AND IMAGE SENSING SYSTEM AND METHOD

(71) Applicant: Realtek Semiconductor Corp., HsinChu (TW)

(72) Inventors: Hung-Chih Lin, HsinChu (TW); Shou-Chan Ho, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 22 days.

(21) Appl. No.: 18/890,794

(22) Filed: Sep. 20, 2024

(65) Prior Publication Data

US 2025/0126378 A1 Apr. 17, 2025

(30) Foreign Application Priority Data

Oct. 12, 2023 (TW) ................................ 112138873

(51) Int. Cl.
*G06F 1/3231* (2019.01)
*G06F 1/3225* (2019.01)
*H04N 23/65* (2023.01)
*H04N 25/77* (2023.01)

(52) U.S. Cl.
CPC ........... *H04N 25/77* (2023.01); *G06F 1/3225* (2013.01); *G06F 1/3231* (2013.01)

(58) Field of Classification Search
CPC .... H04N 23/65; H04N 23/651; G06F 1/3225; G06F 1/3231
USPC ...................................................... 348/207.99
See application file for complete search history.

(56) References Cited

U.S. PATENT DOCUMENTS 6,211,909 B1 * 4/2001 Maeshima ........... H04N 1/0049 348/333.04
10,645,351 B2 * 5/2020 Yen ........................ H04N 7/188
2017/0094311 A1 * 3/2017 Chou ...................... H04N 19/53
2021/0021859 A1 * 1/2021 Kuusela ................. H04N 19/70
2022/0286621 A1 * 9/2022 Keskikangas .... G08B 13/19676
2024/0163456 A1 * 5/2024 Edpalm ................ H04N 19/132

FOREIGN PATENT DOCUMENTS

CN 1322990 A 11/2001
CN 102883648 A 1/2013
CN 114363540 A 4/2022

OTHER PUBLICATIONS https://en.wikipedia.org/wiki/Static_random-access_memory.*
https://en.wikipedia.org/wiki/Dynamic_random-access_memory#PSRAM.*
https://electroniccomponent.com/memory-selection-guide-the-differences-between-dram-sram-nor-flash-and-nand-flash/.*

* cited by examiner

*Primary Examiner* — Anthony J Daniels
(74) *Attorney, Agent, or Firm* — Winston Hsu

(57) ABSTRACT

A pre-roll circuit for an image sensing system is configured to receive a pre-stored image data through an image sensor and provide the pre-stored image data to a camera. The pre-roll circuit includes a first memory and a compressor circuit. The first memory is configured to store the pre-stored image data. The compressor circuit, coupled to the first memory, is configured to compress the pre-stored image data before the pre-stored image data is stored into the first memory.

13 Claims, 4 Drawing Sheets

PRE-ROLL CIRCUIT AND IMAGE SENSING SYSTEM AND METHOD

BACKGROUND OF THE INVENTION

1. Field of the Invention

The present invention relates to a pre-roll circuit, and more particularly, to a pre-roll circuit used for an image sensing system and a related image sensing system and method.

2. Description of the Prior Art

In a common camera system with long-term power supply, the frontend uses an image sensor to capture images and then transmits the images to a camera through a transmission interface. The images undergo a series of image signal processing performed by various devices such as an image signal processor (ISP), video encoder, and image encoder in the camera, and then are subsequently output. This type of camera system may transmit the processed image data to the backend, e.g., through a wired or wireless transmission interface, to the user for real-time online viewing.

Because the image sensor needs to obtain images around the clock and the camera system continuously performs image processing in real time, this system consumes a lot of power and needs to be externally connected to the utility power supply to receive electricity. Another common camera system is battery-based, which provides power through batteries. In the battery-based system, the camera cannot be turned on for a long time to perform image signal processing. Instead, it must be activated when a specific event occurs, in order to save power consumption.

SUMMARY OF THE INVENTION

It is therefore an objective of the present invention to provide a pre-roll circuit used for a battery-based image sensing system, for performing pre-roll functions (or called pre-storing functions) of a camera to provide pre-roll images before the camera is turned on, and also realize a favorable resolution to increase the user experience.

An embodiment of the present invention discloses a pre-roll circuit for an image sensing system. The pre-roll circuit is configured to receive a pre-stored image data through an image sensor and provide the pre-stored image data to a camera. The pre-roll circuit comprises a first memory and a compressor circuit. The first memory is configured to store the pre-stored image data. The compressor circuit, coupled to the first memory, is configured to compress the pre-stored image data before the pre-stored image data is stored into the first memory.

Another embodiment of the present invention discloses an image sensing system, which comprises an image sensor, a camera, a motion sensor and a pre-roll circuit. The image sensor is configured to obtain a plurality of image data. The camera, coupled to the image sensor, is configured to receive a real-time image data among the plurality of image data from the image sensor. The motion sensor, coupled to the camera, is configured to wake up the camera when detecting a moving object. The pre-roll circuit, coupled to the image sensor and the camera, is configured to receive a pre-stored image data among the plurality of image data from the image sensor and provide the pre-stored image data to the camera. The pre-roll circuit comprises a first memory and a compressor circuit. The first memory is configured to store the pre-stored image data. The compressor circuit, coupled to the first memory, is configured to compress the pre-stored image data before the pre-stored image data is stored into the first memory.

Another embodiment of the present invention discloses an image sensing method, which comprises steps of: obtaining a plurality of image data; receiving a pre-stored image data among the plurality of image data; compressing the pre-stored image data and storing the pre-stored image data after being compressed in a first memory; waking up a camera when detecting a moving object, to receive a real-time image data among the plurality of image data; and providing the pre-stored image data stored in the first memory to the camera.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
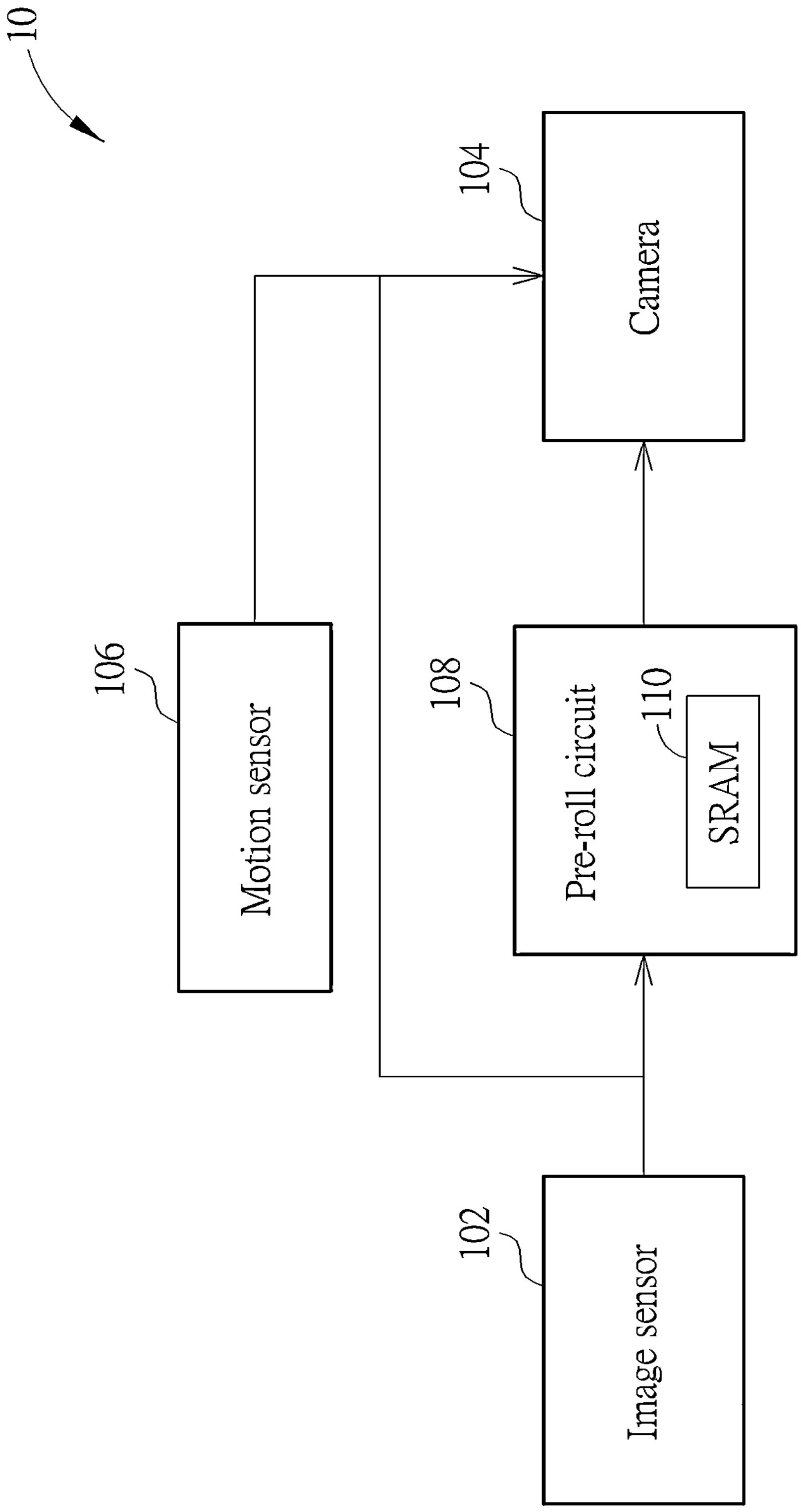
FIG. 1 is a schematic diagram of a battery-based image sensing system according to an embodiment of the present invention.

FIG. 1 is a schematic diagram of a battery-based image sensing system 10 according to an embodiment of the present invention. The image sensing system 10 includes an image sensor 102, a camera 104, a motion sensor 106 and a pre-roll circuit 108. The image sensor 102 is configured to obtain image data, and it may be a monitor device having a camera lens and deployed at the locations that the user needs to monitor, such as a store, yard and gate. The camera 104, which is coupled to the image sensor 102, may receive real-time image data from the image sensor 102. The camera 104 may include various signal processing modules, such as an image signal processor (ISP), video encoder and image encoder, to choose an appropriate method to perform signal processing according to the type of the received image data. In an embodiment, the camera 104 may include a system on chip (SoC), which may integrate various signal processing modules into the integrated circuit in a chip. In addition, according to system requirements, the camera 104 may also include other necessary control devices or peripheral modules, such as a central processing unit (CPU), memory and wireless communication device (e.g., a Wi-Fi communication circuit). These devices or modules are omitted in FIG. 1 without affecting the illustrations of the present embodiment.

The motion sensor 106, coupled to the camera 104, is configured to control the operations of the camera 104. As mentioned above, in the battery-based image sensing system 10, since the electricity supplied by the batteries is limited, the system is not allowed to work for a long time; hence, the camera 104 may start to operate when activated by a specific event. In this embodiment, the camera 104 is usually in a sleep state. When the motion sensor 106 detects a moving object, the motion sensor 106 may output an activation signal to wake up the camera 104, so that the camera 104 starts to receive real-time image data from the image sensor 102 and perform appropriate image signal processing on the received image data. The camera 104 may return to the sleep state when there is no image change for a period of time. In an embodiment, the motion sensor 106 may be a passive infrared (PIR) motion sensor, for detecting the moving object in the scene.

In general, most of the time there are no objects moving in the scene, so the camera 104 will not be activated, so that a large amount of power consumption required by the camera 104 to perform signal processing is saved. Image recording and signal processing are started only when the camera 104 receives a notification from the motion sensor 106. This avoids long-term operations and achieves the purpose of power saving, so that the cycle of replacing the batteries may be extended. However, the above approach will allow the user to only observe the video recorded after the moving object is detected, and cannot obtain the images before the moving object enters the scene. Therefore, the pre-roll circuit 108 is deployed in the image sensing system 10. The pre-roll circuit 108, coupled between the image sensor 102 and the camera 104, is configured to pre-store the image data from the image sensor 102. Regardless of whether there is an object moving in the scene, the pre-roll circuit 108 will continuously capture images, and continuously write the image data into the static random access memory (SRAM) 110 of the pre-roll circuit 108 through a ring buffer. When the motion sensor 106 detects a moving object, in addition to starting to receive real-time image data from the image sensor 102 by the camera 104, the pre-roll circuit 108 also provides the pre-stored image data to the camera 104. As a result, the user may observe the images before and after the moving object enters the scene.

However, in consideration of costs, the space of the SRAM 110 inside the pre-roll circuit 108 is small, and the quantity of image frames that can be pre-stored is very limited. In order to meet the requirement of a certain frame number, the pre-roll circuit 108 usually applies a low-resolution configuration to increase the time length of pre-stored images. However, this will cause the user to easily see the difference in image quality between the pre-stored images and the real-time images, resulting in a degraded user experience.

Figure 2:
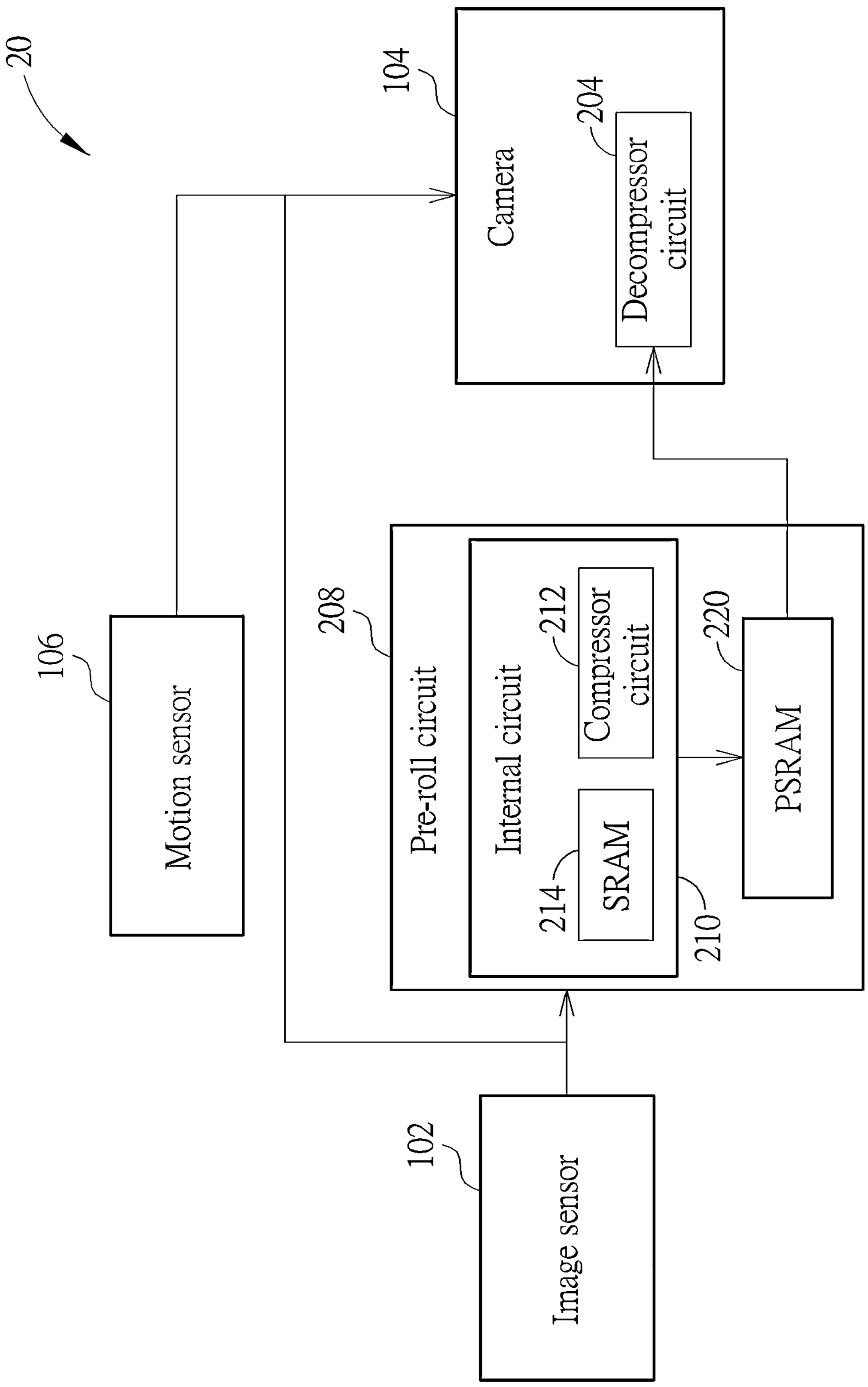
FIG. 2 is a schematic diagram of an image sensing system according to another embodiment of the present invention.

In order to solve the problems in the above embodiment, the present invention provides a system and method which store the pre-stored image data by using a pseudo SRAM (PSRAM), where the pre-stored image data is written into the PSRAM through a ring buffer. FIG. 2 is a schematic diagram of an image sensing system 20 according to another embodiment of the present invention. The difference between the image sensing system 20 and the image sensing system 10 is that the image sensing system 20 is deployed with a pre-roll circuit 208 to replace the pre-roll circuit 108, and that the camera 104 of the image sensing system 20 further includes a decompressor circuit 204. Other devices or modules in the image sensing system 20 are similar to those in the image sensing system 10 shown in FIG. 1, and thus denoted by the same symbols. The related operations of these devices or modules are illustrated in the above paragraphs, and will not be narrated herein.

As shown in FIG. 2, the pre-roll circuit 208 includes an internal circuit 210 and a PSRAM 220. The internal circuit 210 may be an integrated circuit implemented in a companion chip, for performing operations along with the SoC of the camera 104. The PSRAM 220 may be an external memory device, which may be deployed on the same circuit board as the chip of the internal circuit 210 and may be externally connected to the internal circuit 210 through wires. Note that in another embodiment, the PSRAM 220 may also be embedded in the internal circuit 210; that is, the PSRAM 220 and the internal circuit 210 may be integrated into the same chip.

Compared with the smaller space of a general SRAM, the PSRAM 220 used in the present invention has a larger capacity (generally tens of megabytes (MB)), so it can store image data in more frames or with a higher resolution, and can make appropriate arrangements for resolution, frame rate, and time length to meet the needs of product specifications. For example, assuming that the capacity of the PSRAM 220 is 32 MB, by using a 12-bit Bayer Raw format, it can store 24 frames of 720 p video, e.g., a pre-stored image data in 6 seconds with a frame rate equal to 4 frames per second.

However, as for data reading and writing, the power consumed by the PSRAM 220 is approximately 5 to 10 times that of a general SRAM. Note that the image sensing system 20 of the present invention is applied to battery-based products, and its power consumption is often one of the important considerations for the products. In order to reduce the power consumption generated from data reading and writing of the PSRAM 220, the data quantities written into the PSRAM 220 in each frame of pre-stored images should be reduced. Therefore, the internal circuit 210 includes a compressor circuit 212, which may compress the pre-stored image data before the pre-stored image data is stored into the PSRAM 220. As a result, the pre-stored image data stored into the PSRAM 220 is the image data after being compressed, which significantly reduces the power consumption required for reading and writing. The compressor circuit 212 may apply any appropriate algorithm to realize the compression of image data, such as lossless compression or lossy compression. The lossless compression may achieve the compression effect without affecting the image quality, and the lossy compression may achieve a higher compression ratio. An appropriate compression scheme may be selected according to the requirements of image quality for the products, and the selection of compression scheme should not limit the scope of the present invention.

In an embodiment, in order to reduce the complexity of the compression algorithm and reduce the power consumption of the operations of data compression, the compressor circuit 212 may use the differential pulse code modulation (DPCM) technology to perform compression. The DPCM includes spatial DPCM and temporal DPCM, wherein the temporal DPCM may perform compression by referring to image data in different frames. Since the images of the pre-stored image data do not change much, the temporal DPCM may achieve a better compression ratio.

Figure 3:
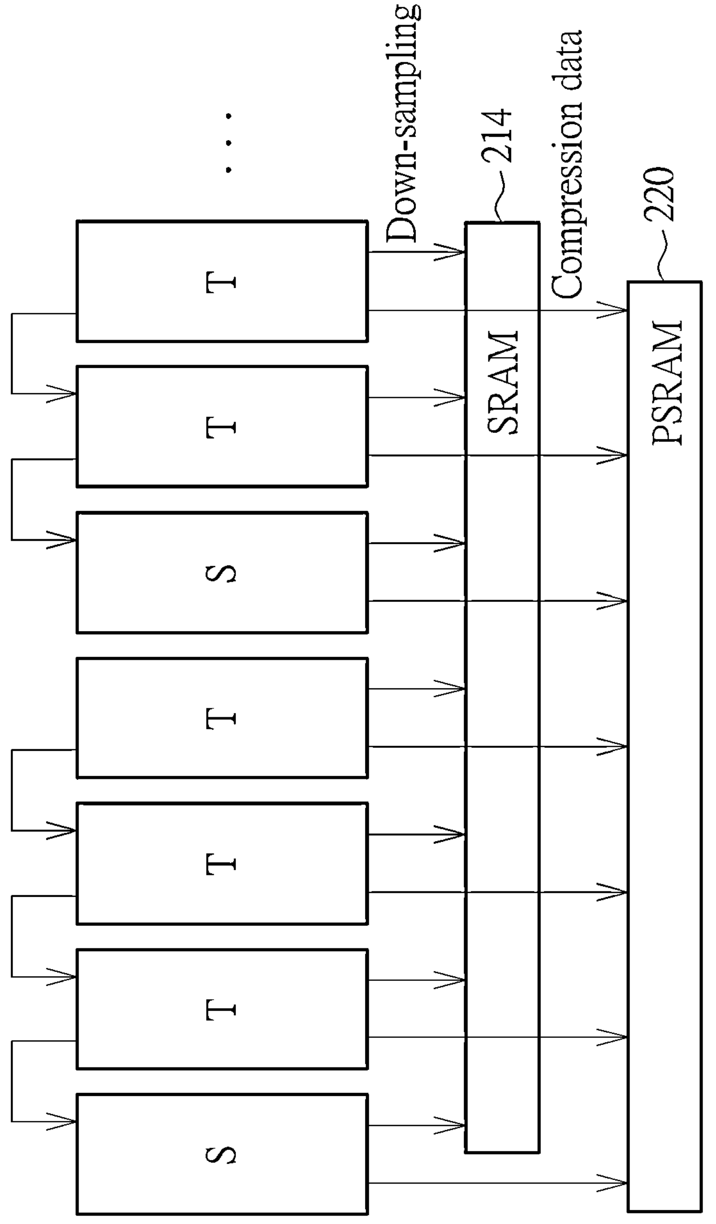
FIG. 3 illustrates image data of a series of input frames applying the encoding architecture of the single reference prediction.

In an embodiment, an image compression method of the single reference prediction may be applied, and an SRAM 214 is disposed in the internal circuit 210 to store the reference frame data required by the compression encoding. FIG. 3 illustrates image data of a series of input frames applying the encoding architecture of the single reference prediction, which includes S-frames and T-frames, where the S-frames use the spatial DPCM to generate the compression data to be written into the PSRAM 220 through intra-frame prediction. While the S-frame is being compressed, the image data of the S-frame may also be stored in the SRAM 214 in the internal circuit 210. Since the space of the SRAM 214 is limited, the image data of the S-frame may be down-sampled before being stored into the SRAM 214. Therefore, the next received T-frame may apply the temporal DPCM to use the down-sampled image data stored in the SRAM 214 as the reference frame, and generate the compression data to be written into the PSRAM 220 through inter-frame prediction. Similarly, the image data of the T-frame may also be down-sampled to be stored into the SRAM 214, as the reference frame for compression of the following T-frame.

As mentioned above, when the camera 104 is woken up by the motion sensor 106, the camera 104 starts to receive the real-time image data from the image sensor 102. Simultaneously, the camera 104 may also receive the pre-stored image data from the PSRAM 220. In this embodiment, the image data stored in the PSRAM 220 are compressed data. Correspondingly, the camera 104 may further include a decompressor circuit 204, to decompress the pre-stored image data received from the PSRAM 220. Afterwards, the pre-stored image data will undergo image processing performed by various signal processing modules.

Please note that the present invention aims at providing a pre-roll circuit used for an image sensing system, for increasing the quality of the pre-stored image of the battery-based system. Those skilled in the art may make modifications and alterations accordingly. For example, the present invention applies a compressor circuit to compress the pre-stored image data and then store the pre-stored image data into the PSRAM. The compressor circuit may use various appropriate compression algorithms, which are not limited to those described in this disclosure. In an embodiment, if the SRAM 214 has enough space, the S-frame or T-frame serving as the reference frame may be directly stored into the SRAM 214 by omitting the down-sampling operation. In another embodiment, the spatial DPCM may be performed on each frame of image data without the usage of the temporal DPCM (i.e., all input frames are considered as S-frames); hence, there is no need to use the reference frame to perform inter-frame prediction, and thus the capacity of the SRAM 214 may further be reduced, to decrease the costs of the internal circuit 210. In addition, the compressor circuit of the present invention may also apply another encoding architecture, such as the Joint Photographic Experts Group (JPEG) encoding. In fact, various transform-based image compression schemes may be applicable to the compressor circuit of the present invention.

In addition, the type of memory should not limit the scope of the present invention. For example, in the above embodiments the external PSRAM 220 is applied to store the pre-stored image data; but in another embodiment, the PSRAM 220 may also be integrated into the internal circuit 210. Alternatively, another type of memory may be applied to store the pre-stored image data, such as the dynamic random access memory (DRAM) or flash memory, but not limited thereto. In addition, the SRAM 214 used for storing the reference frame may also be replaced by another type of memory, which is not limited herein. In another embodiment, in order to further reduce the costs of the image sensing system, the pre-roll circuit and/or the PSRAM may be integrated with the camera to realize the SoC system.

Figure 4:
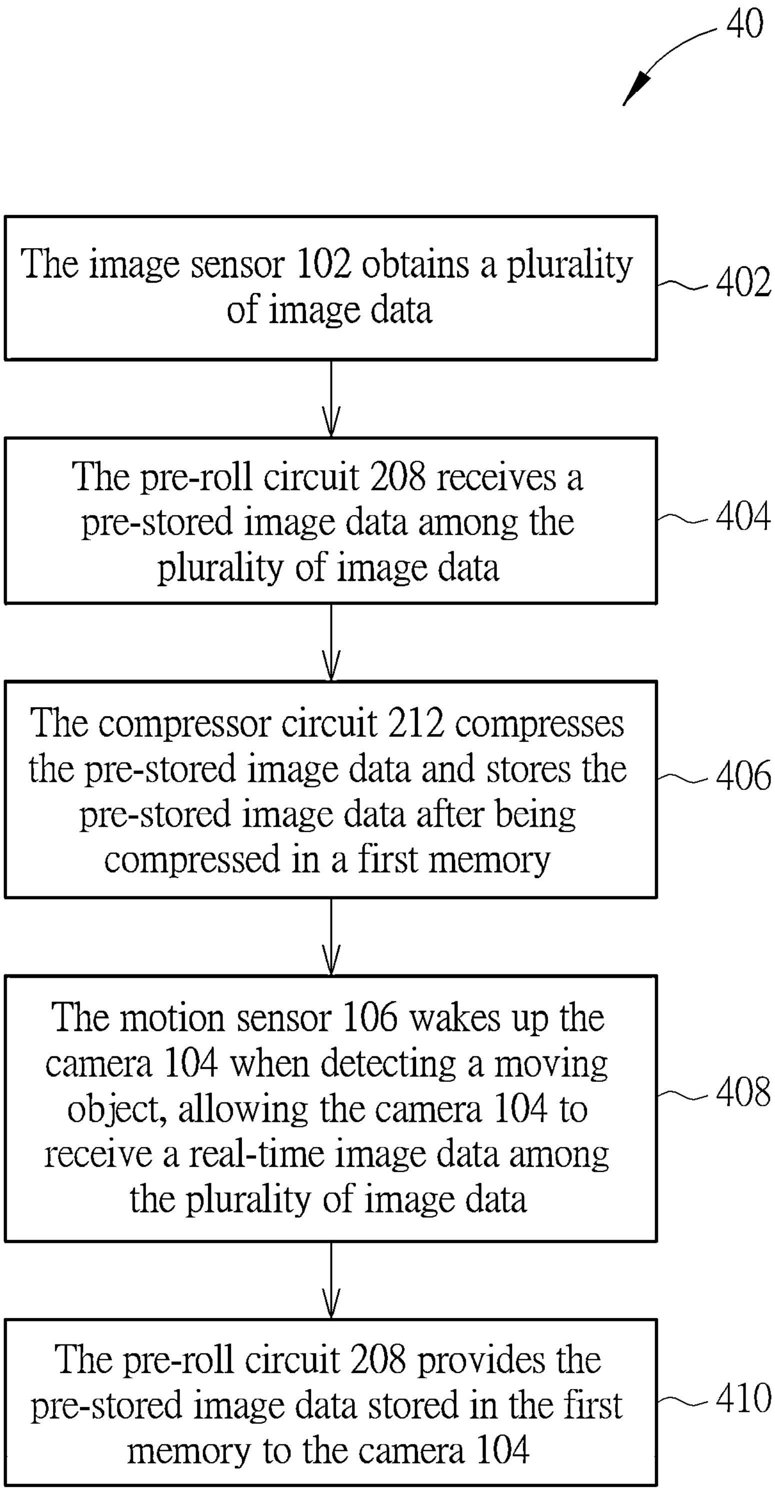
FIG. 4 is a schematic diagram of an image sensing process according to an embodiment of the present invention.

The abovementioned operations of the image sensing system of the present invention may be summarized into an image sensing process 40, as shown in FIG. 4. The image sensing process 40, which may be applied to the image sensing system 20 shown in FIG. 2, includes the following steps:

Step 402: The image sensor 102 obtains a plurality of image data.

Step 404: The pre-roll circuit 208 receives a pre-stored image data among the plurality of image data.

Step 406: The compressor circuit 212 compresses the pre-stored image data and stores the pre-stored image data after being compressed in a first memory.

Step 408: The motion sensor 106 wakes up the camera 104 when detecting a moving object, allowing the camera 104 to receive a real-time image data among the plurality of image data.

Step 410: The pre-roll circuit 208 provides the pre-stored image data stored in the first memory to the camera 104.

In the image sensing process 40, the first memory may be the PSRAM 220 in the above embodiments or any other appropriate memory device. The detailed operations and alterations of the image sensing process 40 are illustrated in the above paragraphs, and will not be narrated herein.

To sum up, the present invention provides a pre-roll circuit used for a battery-based image sensing system and a related image sensing method. The pre-roll circuit may use a PSRAM to store the pre-stored image data. Compared with a general SRAM, the PSRAM has a larger capacity and is able to store image data in more frames or with a higher resolution. In order to save the power consumed by reading and writing of the PSRAM, a compressor circuit may be deployed in the pre-roll circuit, to compress the pre-stored image data and then write the pre-stored image data into the PSRAM. When the camera is woken up and needs to read out the pre-stored image data, the pre-stored image data may be decompressed by a decompressor circuit, and then various image signal processing may be performed on the restored pre-stored image data. As a result, the pre-stored image data obtained by the camera and the real-time image data will have equivalent resolution and image quality, thereby achieving a favorable user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pre-roll circuit for an image sensing system, the pre-roll circuit being configured to receive a plurality of pre-stored image data through an image sensor and provide the pre-stored image data to a camera, the pre-roll circuit comprising:

a first memory, configured to store the pre-stored image data;

a second memory, configured to store a reference frame data among the pre-stored image data; and a compressor circuit, coupled to the first memory, configured to compress the pre-stored image data before the pre-stored image data are stored into the first memory;

wherein the first memory is a pseudo static random access memory (PSRAM) and the second memory is a static random access memory (SRAM), and a storage capacity of the PSRAM is larger than a storage capacity of the SRAM;

wherein the pre-stored image data comprise first image data, and the first image data are compressed to be stored in the first memory and down-sampled to be stored in the second memory.

2. The pre-roll circuit of claim 1, wherein the camera comprises:

a decompressor circuit, configured to decompress the pre-stored image data received from the first memory.

3. The pre-roll circuit of claim 1, wherein the pre-roll circuit is coupled to a motion sensor, and the motion sensor is configured to wake up the camera when detecting a moving object.

4. The pre-roll circuit of claim 3, wherein the camera starts to receive a real-time image data from the image sensor and receive the pre-stored image data from the first memory when the camera is woken up by the motion sensor.

5. The pre-roll circuit of claim 1, wherein the compressor circuit compresses an input frame data among the pre-stored image data according to the reference frame data.

6. An image sensing system, comprising:

an image sensor, configured to obtain a plurality of image data;

a camera, coupled to the image sensor, configured to receive a real-time image data among the plurality of image data from the image sensor;

a motion sensor, coupled to the camera, configured to wake up the camera when detecting a moving object; and a pre-roll circuit, coupled to the image sensor and the camera, configured to receive a plurality of pre-stored image data among the plurality of image data from the image sensor and provide the pre-stored image data to the camera, the pre-roll circuit comprising:

a first memory, configured to store the pre-stored image data;

a second memory, configured to store a reference frame data among the pre-stored image data; and a compressor circuit, coupled to the first memory, configured to compress the pre-stored image data before the pre-stored image data are stored into the first memory;

wherein the first memory is a pseudo static random access memory (PSRAM) and the second memory is a static random access memory (SRAM), and a storage capacity of the PSRAM is larger than a storage capacity of the SRAM;

wherein the pre-stored image data comprise first image data, and the first image data are compressed to be stored in the first memory and down-sampled to be stored in the second memory.

7. The image sensing system of claim 6, wherein the camera comprises:

a decompressor circuit, configured to decompress the pre-stored image data received from the first memory.

8. The image sensing system of claim 6, wherein the camera starts to receive the real-time image data from the image sensor and receive the pre-stored image data from the first memory when the camera is woken up by the motion sensor.

9. The image sensing system of claim 6, wherein the compressor circuit compresses an input frame data among the pre-stored image data according to the reference frame data.

10. An image sensing method, comprising:

obtaining a plurality of image data;

receiving a plurality of pre-stored image data among the plurality of image data;

compressing the pre-stored image data and storing the pre-stored image data after being compressed in a first memory;

storing a reference frame data among the pre-stored image data in a second memory;

waking up a camera when detecting a moving object, to receive a real-time image data among the plurality of image data; and providing the pre-stored image data stored in the first memory to the camera;

wherein the first memory is a pseudo static random access memory (PSRAM) and the second memory is a static random access memory (SRAM), and a storage capacity of the PSRAM is larger than a storage capacity of the SRAM;

wherein the pre-stored image data comprise first image data, and the first image data are compressed to be stored in the first memory and down-sampled to be stored in the second memory.

11. The image sensing method of claim 10, wherein the camera decompresses the pre-stored image data received from the first memory.

12. The image sensing method of claim 10, wherein the camera starts to receive the real-time image data and receive the pre-stored image data from the first memory when the camera is woken up by a motion sensor.

13. The image sensing method of claim 10, wherein the step of compressing the pre-stored image data comprises:

compressing an input frame data among the pre-stored image data according to the reference frame data.

* * * * *